United States Patent
Eisenberg et al.

(10) Patent No.: US 9,992,033 B2
(45) Date of Patent: Jun. 5, 2018

(54) SELECTION OF COMMUNICATION CHANNEL BASED ON CHANNEL SELECTION DATA

(71) Applicant: ENTIT SOFTWARE LLC, Sunnyvale, CA (US)

(72) Inventors: Kobi Eisenberg, Sunnyvale, CA (US); Joseph Gutin, Yehud (IL); Yahalom Humi, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 179 days.

(21) Appl. No.: 14/653,213

(22) PCT Filed: Dec. 19, 2012

(86) PCT No.: PCT/US2012/070567
§ 371 (c)(1),
(2) Date: Jun. 17, 2015

(87) PCT Pub. No.: WO2014/098834
PCT Pub. Date: Jun. 26, 2014

(65) Prior Publication Data
US 2015/0333923 A1    Nov. 19, 2015

(51) Int. Cl.
*G06F 15/16* (2006.01)
*H04L 12/18* (2006.01)

(52) U.S. Cl.
CPC ...... *H04L 12/1822* (2013.01); *H04L 12/1836* (2013.01)

(58) Field of Classification Search
CPC .................. H04L 12/1822; H04L 12/1836
See application file for complete search history.

(56) References Cited

U.S. PATENT DOCUMENTS

| 6,614,757 B1 * | 9/2003 | Rochberger ........ H04L 12/5601 370/231 |
| 8,068,588 B2 | 11/2011 | Ramanathan et al. |
| 8,223,940 B2 | 7/2012 | O'Shaughnessy et al. |
| 2006/0067250 A1 | 3/2006 | Boyer et al. |

(Continued)

FOREIGN PATENT DOCUMENTS

| CN | 101193165 | 6/2008 |
| EP | 1540495 B1 | 7/2011 |

OTHER PUBLICATIONS

Extended European Search Report dated Jun. 30, 2016, EP Patent Application No. 12890336.6 dated Dec. 19, 2012, European Patent Office, 11 pages.

(Continued)

*Primary Examiner* — Mohamed A Wasel

(57) ABSTRACT

Multi-channel communication is affected by system configured to access channel selection data for a participant in a conversation. The channel selection data is analyzed to select a particular secondary communication channel from among a plurality of secondary communication channels associated with the participant. A first message corresponding to the conversation is communicated via the selected secondary communication channel. A second message corresponding to the conversation is received via the selected secondary communication channel. Data representing the conversation is updated using at least a portion of the second message.

13 Claims, 4 Drawing Sheets

(56) References Cited

U.S. PATENT DOCUMENTS

| | | | |
|---|---|---|---|
| 2007/0112918 A1* | 5/2007 | Berstis | G06Q 10/107 709/206 |
| 2008/0086564 A1* | 4/2008 | Putman | H04L 29/06 709/227 |
| 2009/0177981 A1 | 7/2009 | Christie et al. | |
| 2011/0282953 A1 | 11/2011 | Lee et al. | |
| 2012/0198002 A1 | 8/2012 | Goulart et al. | |
| 2012/0259918 A1 | 10/2012 | Bringer et al. | |
| 2012/0304079 A1 | 11/2012 | Rideout et al. | |
| 2014/0025730 A1* | 1/2014 | Allen | H04L 67/42 709/203 |

OTHER PUBLICATIONS

International Preliminary Report on Patentability received in PCT Application No. PCT/US2012/070567, dated Jul. 2, 2015, 8 pages.

CDWG, "Unified Communications and Collaboration," (Research Paper), Apr. 2012, 28 pages, available at http://www.edtechmagazine.com/higher/sites/edtechmagazine.com.higher/files/unified_communications_and_collaborations_-_reference_guide.pdf.

Cisco, "Cisco Jabber Features," (Web Page), 6 pages, available at http://www.cisco.com/web/products/voice/jabber_features.html.

Evans, L., "Benefits of UC for Law Firms," (Web Page), Aug. 8, 2012, 13 pages, available at http://www.altevatel.com/blog/.

Hengel, R. O., "Unified Communications Cross-border Teamwork," (Web Page), 2 pages, available at http://www.t-systems.com/tsip/en/751782/homepage/solutions/infrastructure-services/unified-communication-collaboration/unified-communications/unified-communications.

International Search Report & Written Opinion received in PCT Application No. PCT/US2012/070567, dated Aug. 26, 2013, 12 pages.

* cited by examiner

SELECTION OF COMMUNICATION CHANNEL BASED ON CHANNEL SELECTION DATA

BACKGROUND

Collaboration tools such as e-mail and instant messaging enable participants to engage in conversations and collaborate on a variety of issues. The context of such conversations is discerned by the participants reading the conversation. Initially, the context may be defined by a subject line. All participants view the same information, that is, the same collaboration content. As the e-mail or chat thread grows with static files being added as attachments, the current topic of discussion evolves over time. Moreover, as time goes on various participants move from location to location where they may or may not have access to the same device used to initially engage in the conversation.

DRAWINGS

DETAILED DESCRIPTION

Introduction

Figure 1:
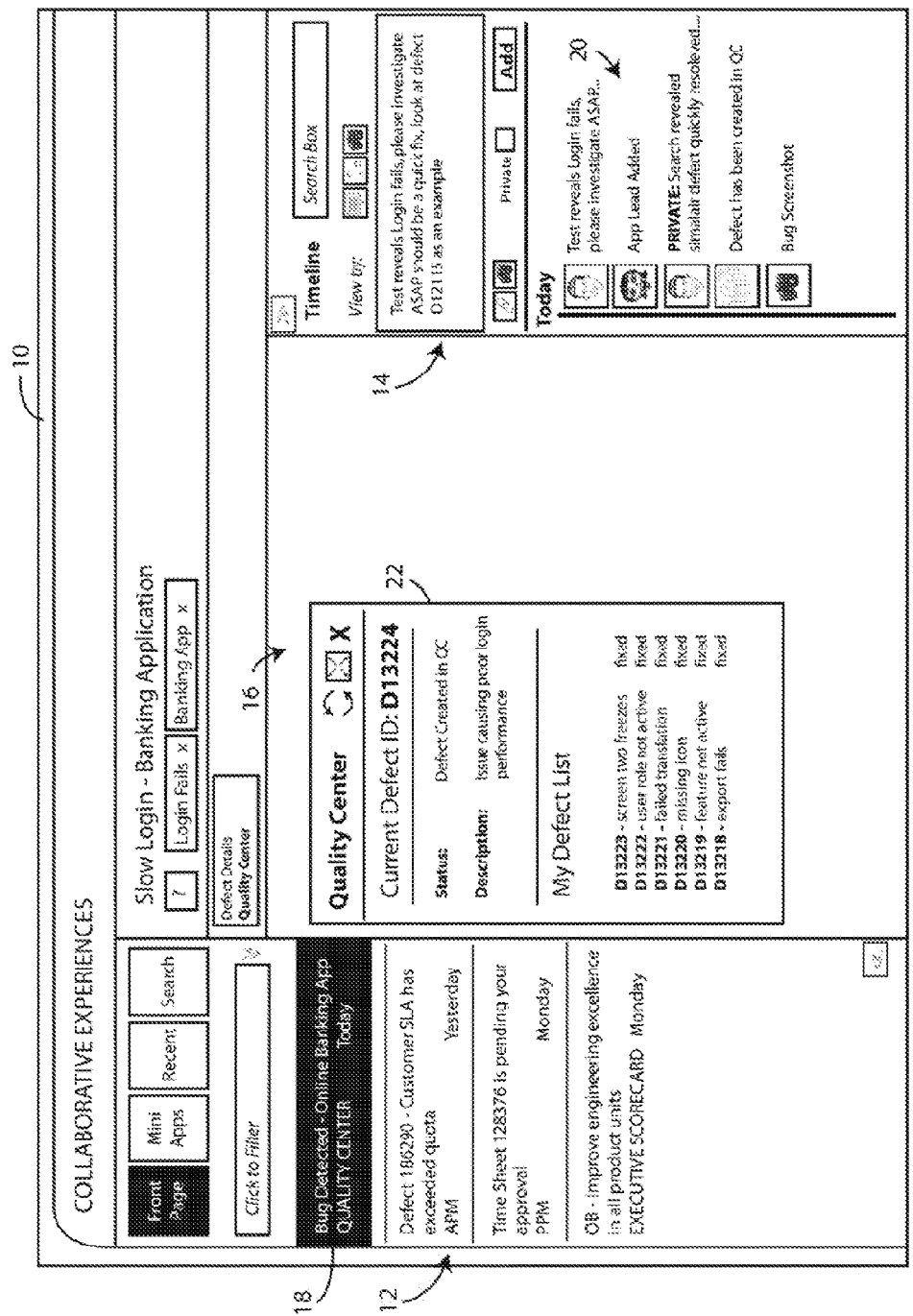
FIGS. 1-4 depict screen views of user interfaces presenting conversation updates according to various examples.

Enterprise software applications can be complex requiring significant training and knowhow for users to extract relevant information or perform specific actions of a given workflow. This is especially true where a workflow extends across applications and organizational silos. The information that a user consumes and the actions that are performed are often dynamic and defined by the context of that workflow. Before an action is taken, a user may collaborate with others to obtain perspective, guidance, or even permission.

An enterprise collaboration tool allows individuals, referred to herein as participants, to engage in a conversation and collaborate on an evolving topic in the context of an application or any other subject. As used herein, a conversation includes a series of interactions between participants. These interactions can include posts from the participants as well as actions taken by or on behalf of the participants. A conversation can be represented by a data structure that is updated as new posts are added. As the data structure is updated it can be important to inform the participants of the change. A participant, as used herein, is an individual that has started, joined, is joining, or has been invited to or otherwise added to a conversation.

Various embodiments, described in detail below, allow the participants to engage in the conversation using a variety of communication channels. The alerts are dynamically routed via a communication channel deemed best suited for reaching a participant in a given context. A communication channel, as used herein, is a particular mechanism for conveying data corresponding to a conversation. As used herein, a communication channel may be a primary channel or a secondary channel. A primary communication channel is the internal channel a collaboration tool used to communicate updates, a web page served by the collaborations tool, for example. A secondary channel is a non-primary channel that can be used to communicate conversation updates to participants who may not currently have access to that communication delivered via the primary channel. Examples of secondary communication channels include email, SMS messaging, voice messaging, and mobile application alerts. As the conversation evolves, participants move from location to location having access to different communication devices at different times.

A participant may initially engage in a conversation through the collaboration tool using a desktop computer. Here, the communication channel is the primary channel provided by the collaboration tool itself. Later, the participant may have internet or SMS (Short Messaging Service) access via a mobile device. At other times, the participant may only have access to a land-line telephone. The embodiments discussed below enable such a participant to be alerted to conversation updates via a particular secondary communication channel deemed appropriate at the time and to allow that participant to respond and continue the conversation using that same communication channel.

The following description is broken into sections. The first, labeled "Illustrative Example," presents an example in which conversation updates are communicated via varying communication channels. The second section, labeled "Environment," describes an environment in which various embodiments may be implemented. The third section, labeled "Components," describes examples of various physical and logical components for implementing various embodiments. The fourth section, labeled as "Operation," describes steps taken to implement various embodiments.

Illustrative Example

FIGS. 1-4 depict screen views of user interfaces used to display a conversation between participants. FIG. 1 depicts an example interface presented when a participant has direct access to an enterprise collaboration tool. Here, for example, the participant may be utilizing a local application installed on the participant's computer. The participant may instead be accessing the collaboration tool via a web application.

In the example of FIG. 1, a participant has entered a defect in a bug reporting application and has started a conversation concerning that defect in a collaboration tool. FIG. 1 depicts a screen view 10 of a user interface of that collaboration tool. In this example screen view 10 is divided into three main sections 12, 14, and 16. Section 12 provides an area to display a list of conversations the particular participant is associated with. Here, conversation 18 concerning the defect is highlighted, and, as a result, collaboration content for that conversation is displayed in sections 14 and 16. Section 14 displays posts 20 of conversation 18 while section 16 displays a facet 22 of the bug reporting application.

In FIG. 1 posts 20 are shown to include four elements defining activity to date for conversation 18. The first element indicate that a screenshot was recorded depicting the defect at issue, and the second element indicates that a defect has been created in the bug reporting tool. Facet 22 depicts information from the bug reporting tool relevant to the participant viewing the collaborative content. Here that participant is the person who entered the defect in the bug reporting tool. The information presented includes the status and a description of the new defect as well as a list of other defects entered by the participant. The, the participant is presented with a personalized facet 22 with information directly relevant to the participant.

Figure 2:
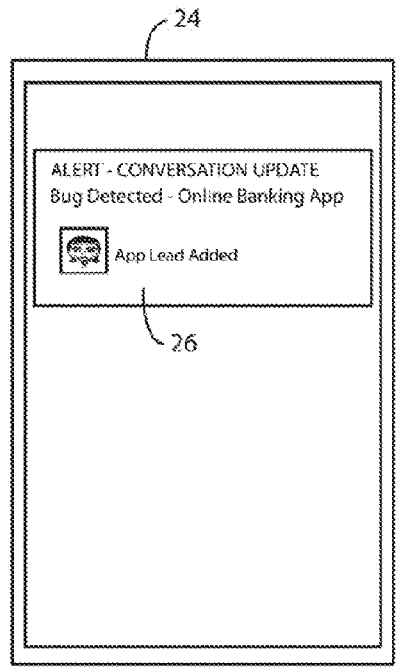
Figure 2:
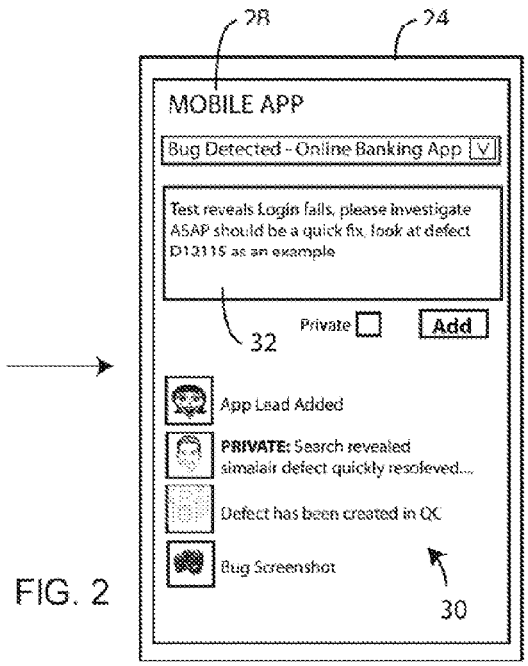
Figure 3:
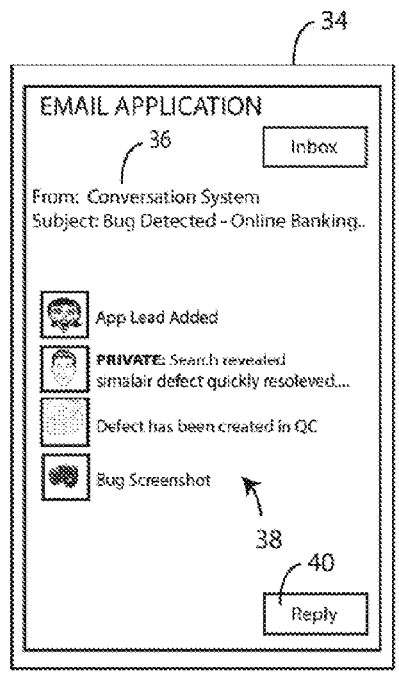
Figure 4:
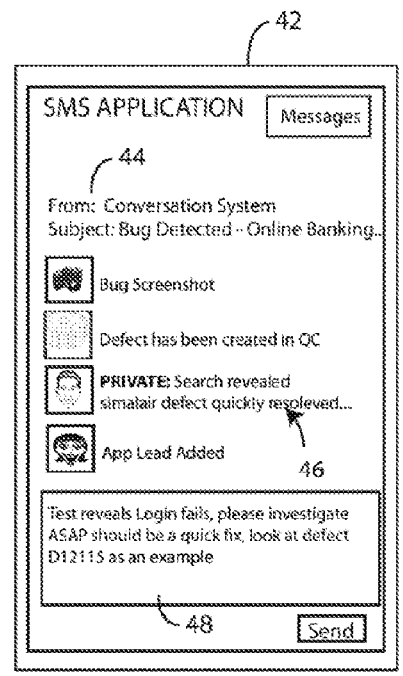

As conversation 18 develops, additional posts 20 are added. Where a participant has access to a user interface such as presented in FIG. 1, the participant has access to real time updates and can respond as needed to continue conversation 18. However, a participant many times will not have such access when traveling or otherwise away from her desk. FIGS. 2-4 depict example mobile interfaces presenting communication updates to users via secondary communication channels.

Starting with FIG. 2, a participant has access to a mobile phone 24 on which a specialized mobile client application for interacting with the collaboration tool has been installed. Following an update to conversation 18 (FIG. 1), the mobile application receives a communication from the collaboration tool and displays alert 26. Here that alert corresponds to a newly added post. Upon the participant's selection of alert 26, the mobile application 28 opens displaying posts 30 of conversation 18. The mobile application 28 also allows the participant enter a new post 32 to be communicated back to the collaboration tool.

In FIG. 3, the participant has access to email via device 34 and has received an email 36 from the collaboration tool that when displayed shows posts 38. To enter a new post, the participant need only activate replay control 40 and respond to email 36. In FIG. 4, the participant has access to a mobile phone with SMS capabilities. Here, the participant has received an SMS messages 44 from the collaboration that when displayed shows posts 46. Message 44 may be a series of messages each corresponding to a different post 46. To add a new post and continue the conversation, the participant need only send response 48.

To summarize, FIG. 1 depicts a user interface where conversation updates are communicated via a primary communication channel. This means, for example, a participant accessing a web based collaboration tool may see the updates in real time as they are processed by the tool. In FIGS. 2-4, a participant is alerted to conversation updates through various secondary communication channels that include a channel to a mobile application, an e-mail channel, and an SMS channel. As will be discussed below, these are examples of many alternative secondary communication channels that can be used.

Figure 5:
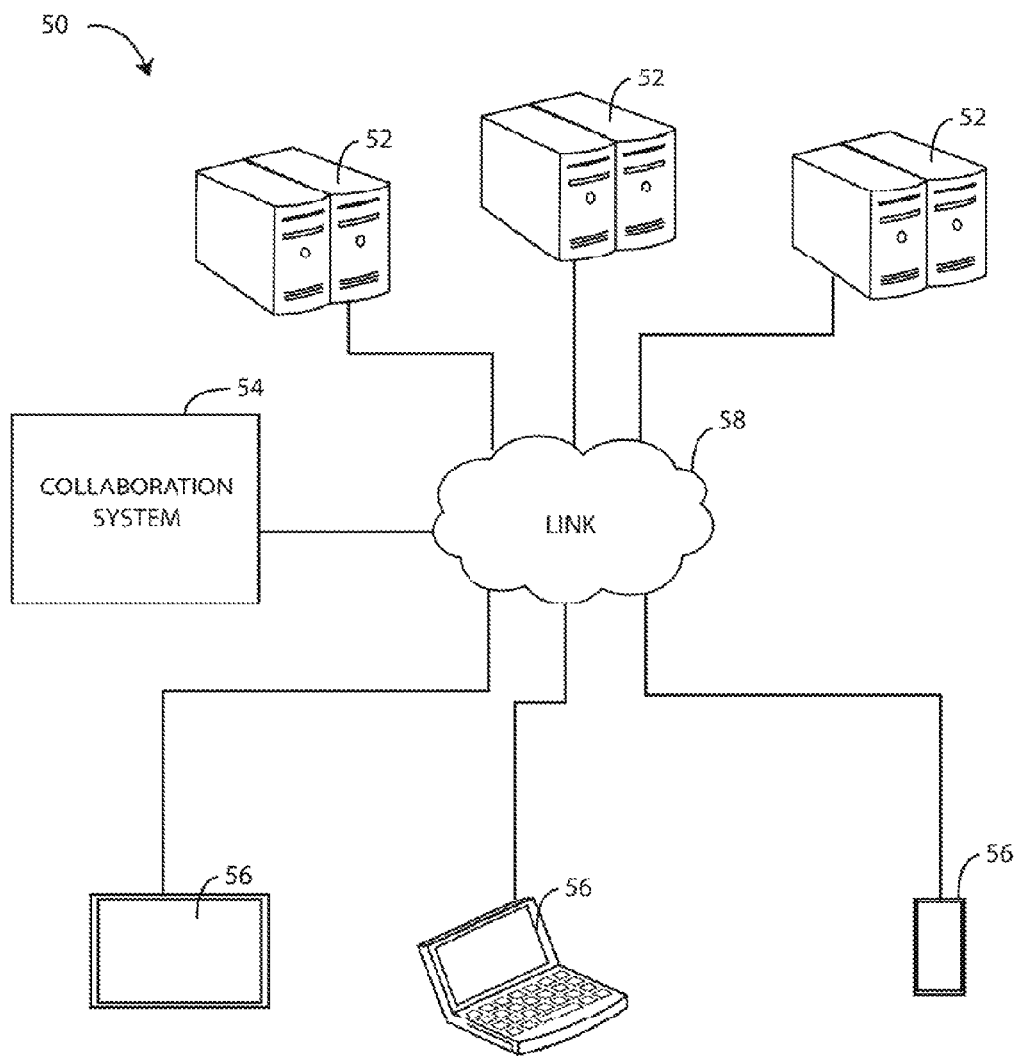
FIG. 5 depicts an environment in which various embodiments may be implemented.

Environment:

FIG. 5 depicts an environment 50 in which various embodiments may be implemented. Environment 50 is shown to include application services 52, collaboration system 54, and client devices 56. Application services 52 each represent a computing device or combination of computing devices configured to serve an application to client devices 56. Examples can include enterprise and consumer web and cloud applications provided through service oriented architectures.

Conversation system 54 represents a computing device or combination of computing devices configured to serve a collaboration tool or application to client devices 56. The collaboration tool allows users to view and post to conversations in the context of applications served by services 30. In general, collaboration system 56 enables participants utilizing client devices 56 to engage in a conversation using any number of differing secondary communication channels. Client devices 50 each represent a computing device configured to interact with collaboration system 54 and, in some cases, application services 52. Such interaction may be through a browser or other application executing on a given client device 54. In other cases, where a given client device 34 is used for voice communication, the interaction may be voice based with collaboration system 54 or an intermediary converting electronic data to human voice signals and vice-versa.

Link 58 represents generally one or more of a cable, wireless, fiber optic, or remote connections via a telecommunication link, an infrared link, a radio frequency link, or any other connectors or systems that provide electronic communication. Link 58 may include, at least in part, an intranet, the Internet, or a combination of both. Link 58 may also include intermediate proxies, routers, switches, load balancers, and the like.

Figure 6:
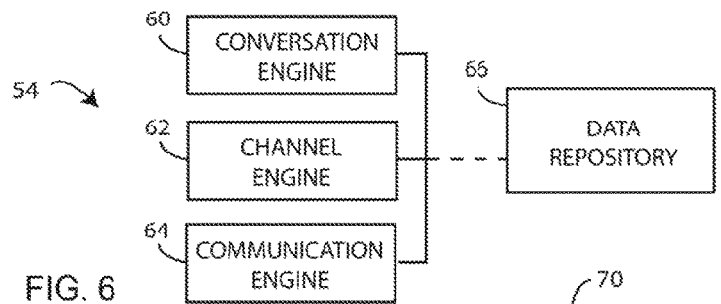
FIG. 6 depicts a system according to an example.
Figure 7:
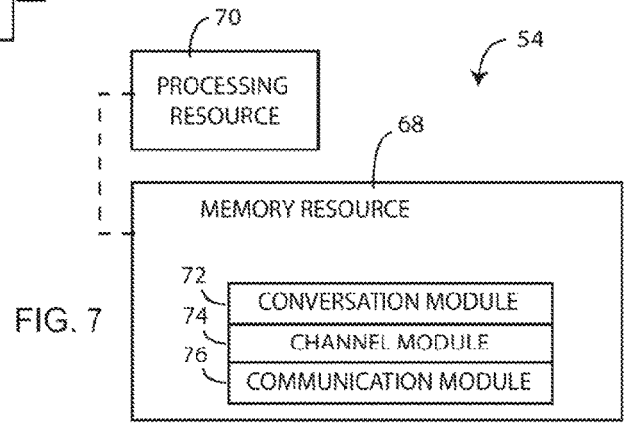
FIG. 7 is a block diagram depicting a memory resource and a processing resource according to an example.

Components:

FIGS. 6 and 7 depict examples of physical and logical components for implementing various embodiments. In FIG. 6 various components are identified as engines 60-64. In describing engines 60-64, focus will be on each engine's designated function. However, the term engine, as used herein, refers to a combination of hardware and programming configured to perform a designated function. As is illustrated later with respect to FIG. 7, the hardware of each engine, for example, may include a processor and a memory, while the programming is code stored on that memory and executable by the processor to perform the designated function.

FIG. 6 depicts collaboration system 54 for affecting multi-channel conversations. Collaboration system 54, for example, may be a subcomponent of an overall collaboration tool. In the example of FIG. 6, system 54 includes conversation engine 60, channel engine 62, and communication engine 64. Data repository 66 represents memory configured to store data maintained and utilized by collaboration system 54. Such data can include a repository of conversations. In other words, repository 66 can contain data indicative of conversations between one or more groups of participants. For a given conversation, the data can represent the various posts to that conversation, the topic or subject matter of the conversation, and information identifying the participants in the conversation. Repository 66 may also contain data indicative of participant roles and communication preferences.

Conversation engine 60 is configured to monitor conversation data indicative of or otherwise representing a conversation between a plurality of participants. Conversation engine 60 is responsible for updating the conversation data according to messages received from the participants to that conversation. In the example of FIG. 6, conversation engine 60 may access data repository 66 when maintaining and updating the conversation data. The conversation data can be used, as will be discussed below, to communicate messages to participants as posts are added or the conversation is otherwise updated.

The following is an example of a table characterizing the structure of the conversation data maintained by conversation engine 60 and stored in data repository 66.

| Conversation | Participants | Post | Topic(s) |
|---|---|---|---|
| CID(1) | PID(1) | Post(1) | Topic(1) |
| CID(2) | PID(2) | Post(2) | Topic(2) |
| ... | ... | ... | ... |
| CID(n) | PID(n) | Post(n) | Topic(n) |

In this example, each conversation is represented by a row. Each row has a cell containing a conversation identifier distinguishing that conversation from the others. Each row also has a cell containing data identifying the participants in the corresponding conversation and a cell containing data indicative of the posts to that conversation. Each row has a cell containing data indicative of a conversation topic. Topic specificity can range from general to precise. For example, one conversation may relate to the defect entered for a particular application. Another conversation may relate to application defects in general. Data in the topic cell may also indicate a level of relevance for the topic with respect to a given participant. For example, the conversation concerning the application defect may be highly relevant to one or more participants to the conversation. As will be discussed below, such topic data can be used in selecting a secondary communication channel for reaching a participant.

Channel engine 62 is responsible, for each of the plurality of participants, to select a particular secondary communication channel from among a plurality of secondary communication channels associated with that participant. For example, as the conversation is updated with a new post, channel engine 62 is responsible for selecting a secondary communication channel for communicating a message indicative of that update for each participant. It is noted that different secondary channels can be selected for different participants based on a number of factors.

To realize its function channel engine 62 may utilize channel selection data. As used herein, channel selection data is data that can be used to select a particular secondary communication channel for communicating a message corresponding to an update to a conversation. The channel selection data may identify the role and preferences of each participant. The channel selection data may also indicate participant presence. Such data may be maintained in data repository 66.

To help explain, the following is an example of a table characterizing the structure of the channel selection data.

| Participant | Channels | Presence | Relevance | Preferences |
|---|---|---|---|---|
| PID(1) | Ch(1) | Pres(1) | R(1) | Pref(1) |
| PID(2) | Ch(2) | Pres(2) | R(2) | Pref(2) |
| . . . | . . . | . . . | . . . | . . . |
| PID(n) | Ch(n) | Pres(n) | R(n) | Pref(n) |

In this example, each row represents channel selection data for a given participant. Each row has a cell containing a participant identifier distinguishing that participant from the others. Each row also has a cell containing data identifying the particular secondary communication channels available to that participant. Such data, for example, may identify an email address, a telephone number, a mobile phone number for text messages, and any other information that can be used to utilize a communication channel to reach that participant.

Each row has a cell containing presence data and a cell containing relevance data. Presence data, as used herein, is data identifying whether or not a participant is currently available or should be reached using a given secondary communication channel. For example, presence data may indicate that the user has been recently participating in a conversation using a particular secondary communication channel. Presence data may also include location data reported by the participant's mobile device. Relevance data is information used to determine the relevance of a conversation to the given participant. Such data may identify the participant's role such that conversation relevance can be determined by comparing the topic of a conversation to that role. Relevance data may also include participant specified topics, conversations, and participants. Thus, relevance data can be used to determine a level of relevance that a conversation or conversation update has with a given participant and a corresponding level of urgency that an update to that conversation be successfully communicated to a given participant. In some cases it may be urgent to communicate all conversation updates, just those updates entered by a specified participant, or posts that correspond to some form of a status change for the topic of the conversation.

Each row has a cell containing data identifying communication preferences for a given participant. Such data may identify a preferred secondary communication channel. Preference data may include information for determining which secondary communication channel to use according to a schedule or presence data for a given participant. The data may also identify a channel to be used only for conversation updates deemed urgent. Such a secondary channel may, for example, identify an SMS number or a voice number to be used to communicate urgent updates when presence data indicates that the given participant is not available via a primary communication channel or preferred secondary communication channel.

Thus, in one example, channel engine 62 may, regardless of urgency, select a preferred secondary communication channel for a participant where the presence data indicates the participant can be reached using that channel. Channel engine 62 may select a different secondary communication channel such as voice, SMS, email, or mobile application alert according to presence data and the determined urgency. For example, where presence data indicates that the participant is using his mobile device, an SMS channel may be selected. Where there is urgency, a voice channel may be selected if presence data cannot be used to locate the participant. In other cases, channel engine 62 may simply follow a schedule, selecting a preferred secondary channel during working hours, an SMS channel in the evening, and email during sleeping hours for updates not deemed to be urgent.

Communication engine 64 is configured to, for each of the plurality of participants, communicate messages indicative of conversation updates via the secondary communication channel selected by channel engine 62. To avoid duplicative messaging, communication engine 62 may not communicate messages via non-selected secondary communication channels. Communication engine 64 is also responsible for receiving messages via the same selected communication channels. Communication engine 64 passes received messages to conversation engine 60 for processing to update the corresponding conversation data. Communication engine 64 may, for example, include a number of agents responsible for different secondary communication channels. In general, engine 64 may include any agent configured to communicate messages via any secondary communication channel capable of being used to send and receive messages indicative of updates to a conversation. For example, one agent may be configured to send emails containing conversation updates. That same or a different agent may be responsible for receiving email responses containing data for updating that conversation. Likewise, different agents may be configured for SMS messaging and voice messaging. Agents responsible for voice messaging are responsible for translating the data representing a conversation update (such as a new post) to a voice message that can be played and heard by the participant. Likewise, the agent is responsible for translating the participant's voice signals to a format for use in updating the conversation data.

Thus, once channel engine 62 selects a secondary communication channel with respect to a given participant, communication engine 64 is responsible for sending a message indicative of a conversation update via that selected channel. Communication engine 64 is also responsible for receiving a message from the participant via that same secondary communication channel and passing at least a portion of that message on to conversation engine 60 for use by engine 60 to update the corresponding conversation. This is a continual process. As the conversation is updated by conversation engine 60, channel engine 62 identifies the appropriate secondary communication channel for each participant in that conversation, and communication engine 64 communicates messages indicative of the conversation update to the participants via the selected secondary channels. Communication engine 64 then receives messages back on those same secondary channels containing data for further updating the conversation, and the process repeats again.

Communication engine 64 may maintain different logical queues for different secondary communication channels and different participants. In some instances conversation updates may be rapidly being received from multiple conversation participants. In such cases it may not be desirable to send separate emails to a given participant for each update. Here, a secondary communication channel may be associated with message threshold data. The threshold data may identify a message count and a message velocity. A message velocity may, for example, indicate messages are to be queued until no more than "x" number of messages have been received in the past "y" minutes. A message count may indicate that messages are to be queued until the queue contains "z" messages or the message velocity falls below the specified threshold. Thus, communication engine 64 may be configured to, for a given secondary communication channel, queue the messages to be delivered to a given participant. Communication engine 64 may then communicate the queued messages in a single communication via the selected secondary communication channel only a condition corresponding to the threshold data for the given secondary communication channel has been met. That condition, for example, may be that a count of queued messages for the participant exceeds the specified message count or that a velocity of messages entering the queue for the participant falls below the specified threshold velocity.

A participant responding to a message delivered via a secondary communication channel such as email or SMS, may have the occasion to add third party recipients in a response received by communication engine 64. In such cases, communication engine 64 may inform conversation engine 60 of the third parties allowing conversation engine 60 to add the third parties as participants to the conversation. Such may be accomplished by updating the conversation data for the particular conversation such that future message corresponding to the conversation will be communicated to the third parties via communication channels associated with those third parties.

In foregoing discussion, various components were described as combinations of hardware and programming. Such components may be implemented in a number of fashions. Looking at FIG. 7, the programming may be processor executable instructions stored on tangible memory resource 68 and the hardware may include processing resource 70 for executing those instructions. Thus memory resource 68 can be said to store program instructions that when executed by processing resource 70 implement system 54 of FIG. 7.

Memory resource 68 represents generally any number of memory components capable of storing instructions that can be executed by processing resource 70. Memory resource 68 is non-transitory in the sense that it does not encompass a transitory signal but instead is made up of more or more memory components configured to store the relevant instructions. Memory resource 68 may be implemented in a single device or distributed across devices. Likewise processing resource 70 represents any number of processors capable of executing instructions stored by memory resource 68. Processing resource 70 may be integrated in a single device or distributed across devices. Further, memory resource 68 may be fully or partially integrated in the same device as processing resource 70, or it may be separate but accessible to that device and processing resource 70.

In one example, the program instructions can be part of an installation package that when installed can be executed by processing resource 70 to implement system 54. In this case, memory resource 68 may be a portable medium such as a CD, DVD, or flash drive or a memory maintained by a server from which the installation package can be downloaded and installed. In another example, the program instructions may be part of an application or applications already installed. Here, memory resource 68 can include integrated memory such as a hard drive, solid state drive, or the like.

In FIG. 7, the executable program instructions stored in memory resource 68 are depicted as conversation module 72, channel module 74, and communication module 76. Conversation module 72 represents program instructions that when executed cause processing resource 70 to implement conversation engine 60 of FIG. 6. Channel module 74 represents program instructions that when executed cause the implementation of channel engine 62. Likewise, communication module 76 represents program instructions that when executed cause the implementation of communication engine 64.

Figure 8:
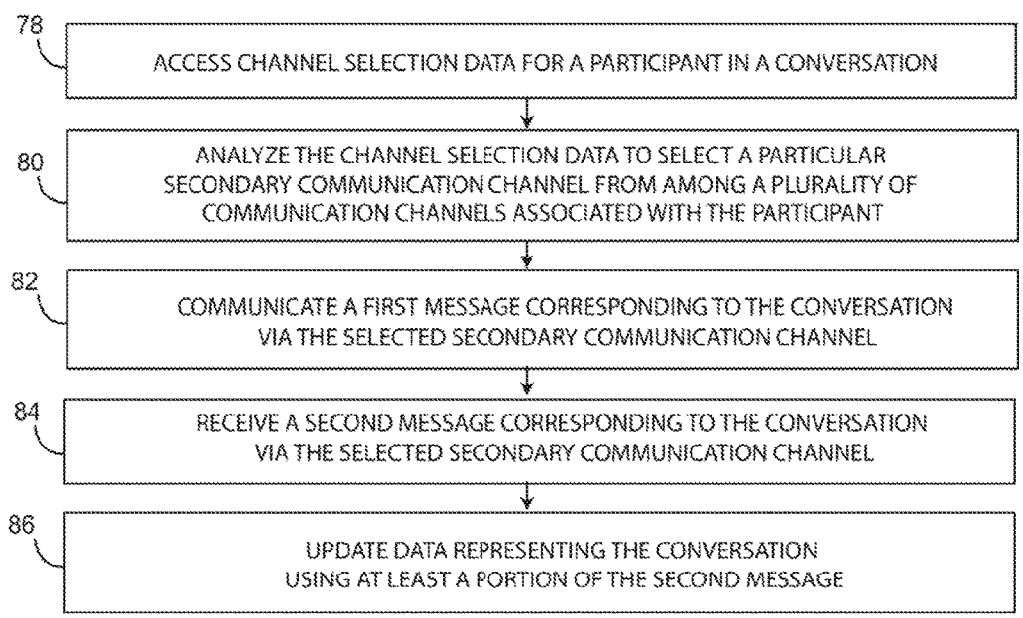
FIG. 8 is a flow diagram depicting steps taken to implement an example.

Operation:

FIG. 8 is a flow diagram of steps taken to implement a method for affecting a multi-channel conversation. In discussing FIG. 8, reference may be made to the screen views of FIGS. 1-4 and components depicted in FIGS. 5-7. Such reference is made to provide contextual examples only and not to limit the manner in which the method depicted by FIG. 8 may be implemented.

Presuming a conversation has been started, channel selection data is accessed for a participant in that conversation (step 78). Referring to FIG. 6, channel engine 62 may be responsible for implementing step 78. The conversation may be represented by conversation data maintained by conversation engine 60. That data may identify the participant. With the participant identified, channel engine 62 can then access channel selection data associated with that participant.

The channel selection data is then analyzed to select a particular secondary communication channel from among a plurality of communication channels associated with the given participant (step 80). Again, channel engine 62 may be responsible for implementing step 80. As previously described, the selection data may identify secondary communication channels for the participant and participant preference data, presence data, and relevance data for use in selecting one of those secondary communication channels. Thus, depending on the user preference data, the presence data, and the relevance data, different secondary communication channels can be selected based on a variety of factors such as time of day the participant's locations, and the relevance of the conversation in question to the participant.

A first message corresponding to the conversation is communicated via the secondary communication channel selected in step 80 (step 82). To avoid duplicative messaging, step 82 may include not communicating the first message via another of the secondary communication channels associated with the participant. Referring to FIG. 6, communication engine 64 may be responsible for implementing step 82. Depending on the selected secondary channel, step 82 may involve sending an email, an SMS message, or a voice message.

A second message corresponding to the same conversation is received via the secondary communication channel selected in step 80 (step 84). Again, communication engine 64 may be responsible for implementing step 84. That second message, for example, may be an email containing information for the participant to be included in a post to the conversation. The message may be an SMS communication containing the same information or a voice communication that is recorded and converted to text.

The conversation data is then updated using at least a portion of the second message (step 86). Conversation engine 60 of FIG. 6 may be responsible for implementing step 86. The at least a portion of the second message is the data the participant intended to be used to add a post to the conversation.

CONCLUSION

FIGS. 1-4 depict example screen views of various user interfaces. The particular layouts and designs of those user interfaces are examples only and intended to depict a sample workflow in which personalized collaboration content is presented to different participants of a collaborative experience. FIGS. 5-7 aid in depicting the architecture, functionality, and operation of various embodiments. In particular. FIGS. 6 and 7 depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Embodiments can be realized in any memory resource for use by or in connection with processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is any non-transitory storage media that can contain, store, or maintain programs and data for use by or in connection with the instruction execution system. The term "non-transitory is used only to clarify that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the flow diagram of FIG. 8 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A memory resource storing instructions that when executed cause a processing resource to:
   access channel selection data for a participant in a conversation;
   analyze the channel selection data to select a particular secondary communication channel from among a plurality of secondary communication channels associated with the participant;
   queue a first message corresponding to the conversation;
   communicate the queued first message corresponding to the conversation to the participant via the selected secondary communication channel after a determination that a count of queued messages for the participant exceeds a message count or a velocity of messages in a queue for the participant falls below a threshold velocity;
   receive a second message corresponding to the conversation via the selected secondary communication channel; and
   update data representing the conversation using at least a portion of the second message.

2. The resource of claim 1, wherein;
   the channel selection data includes at least one of participant preference data and participant presence data; and
   the instructions when executed cause the processing resource to analyze the at least one of the participant preference data and participant presence data to select the particular secondary communication channel.

3. The resource of claim 1, wherein the channel selection data includes data corresponding to a relevance of the participant to the conversation and the instructions, when executed, cause the processing resource to analyze the channel selection data to:
   select a first particular channel from among the plurality of secondary communication channels upon a determination that the data corresponding to the relevance is indicative of a first relevance level; and
   select a second particular channel from among the plurality of secondary communication channels upon a determination that the data corresponding to the relevance is indicative of a second relevance level.

4. The resource of claim 1, wherein the second message was also communicated to a third party, and
   wherein the instructions, when executed, cause the processing resource to add the third party as a participant in the conversation such that a future message corresponding to the conversation will be communicated to the third party via a communication channel associated with the third party.

5. A system, comprising:
   a non-transitory computer readable resource storing instructions that when executed by a processing resource cause the processing resource to:

maintain conversation data indicative of a conversation between a plurality of participants;
update the conversation data according to messages received from the participants;
for each of the plurality of participants, analyze channel selection data for that participant to select a particular secondary communication channel from among a plurality of secondary communication channels associated with that participant; and
for each of the plurality of participants, communicate a first message indicative of an initial update to the conversation data via the selected secondary communication channel to that participant and receive a second message via that selected secondary communication channel from that participant, wherein the second message affects a subsequent update to the conversation data,
wherein, to communicate the first message to a particular participant, the instructions are to cause the processing resource to:
queue the first message; and
communicate the queued first message to the particular participant via the selected secondary communication channel after a determination that a count of queued messages for the particular participant exceeds a message count or a velocity of messages in a queue for the particular participant falls below a threshold velocity.

6. The system of claim 5, wherein following any subsequent update to the conversation data:
the instructions are to cause the processing resource to, for each of the plurality of participants, analyze the channel selection data for that participant to subsequently select a particular secondary communication channel from among the plurality of secondary communication channels associated with that participant, and for each of the plurality of participants, communicate a third message indicative of any one or more of the subsequent updates to the conversation data via the subsequently selected secondary communication channel for that participant.

7. The system of claim 5, wherein:
the channel selection data for each participant includes preference data and presence data for that participant; and
the instructions are to cause the processing resource to analyze the participant preference data and participant presence data to select the particular secondary communication channel that will be used to communicate the first message and receive the second message.

8. The system of claim 7, wherein the channel selection data for one of the plurality of participants includes data indicative of a relevance level for that participant with respect to the conversation and the instructions are to cause the processing resource, for that participant, to analyze the channel selection data to:
select a first particular channel from among the plurality of secondary communication channels upon a determination that the data indicative of the relevance level indicates a first level and the presence data for that participant indicates a first presence type; and
select a second particular channel from among the plurality of secondary communication channels upon a determination that the data indicative of the relevance level indicates a second level and the presence data for that participant indicates the first presence type.

9. The system of claim 5, further comprising the processing resource.

10. A non-transitory computer readable medium that when executed by a processor cause the processor to:
access channel selection data for each of a plurality of participants to a conversation;
for each participant, utilize the channel selection data for that participant to select a particular secondary communication channel from among a plurality of secondary communication channels available for that participant;
queue a first message corresponding to the conversation;
communicate the queued first message corresponding to the conversation to a particular participant via the secondary communication channel selected for that particular participant after a determination that a count of queued messages for the particular participant exceeds a message count or a velocity of messages in a queue for the particular participant falls below a threshold velocity;
receive a second message via that same secondary communication channel; and
maintain data representing the conversation and update the data based on the second message.

11. The non-transitory computer readable medium of claim 10, wherein the channel selection data for the particular participant includes at least one of participant preference data and participant presence data; and
the instructions are to, for the particular participant, analyze the at least one of the participant preference data and participant presence data to select the particular secondary communication channel from the plurality of secondary communication channels available for that particular participant.

12. The non-transitory computer readable medium of claim 11, wherein:
the channel selection data for the particular participant includes data corresponding to a relevance of that participant to the conversation,
the instructions are to cause the processor to analyze the channel selection data for that particular participant to:
select, a first particular channel from among the plurality of secondary communication channels available for that particular participant upon a determination that the data corresponding to the relevance is indicative of a first relevance level; and
select a second particular channel from among the plurality of secondary communication channels available for that particular participant upon a determination that the data corresponding to the relevance is indicative of a second relevance level.

13. The non-transitory computer readable medium of claim 10, wherein:
a particular one of the second messages was also communicated to a third party; and
the instructions are to cause the processor to add the third party as a participant in the conversation such that a future message corresponding to the conversation will be communicated to the third party via a secondary communication channel available for the third party.

* * * * *